W. A. VAN BERKEL.
MEAT SUPPORT FOR MEAT SLICING MACHINES.
APPLICATION FILED SEPT. 17, 1909.

1,007,991.

Patented Nov. 7, 1911.

Witnesses:
P. F. Nagle
L. Rouville

Inventor:
Wilhelmus Adrianus van Berkel
By Wiedersheim & Fairbanks
Attorneys.

UNITED STATES PATENT OFFICE.

WILHELMUS ADRIANUS VAN BERKEL, OF ROTTERDAM, NETHERLANDS.

MEAT-SUPPORT FOR MEAT-SLICING MACHINES.

1,007,991.         Specification of Letters Patent.         Patented Nov. 7, 1911.

Application filed September 17, 1909.   Serial No. 518,154.

*To all whom it may concern:*

Be it known that I, WILHELMUS ADRIANUS VAN BERKEL, a subject of the Queen of the Netherlands, residing at Rotterdam, Netherlands, have invented a certain new and useful Improved Meat-Support for Meat-Slicing Machines, of which the following is a specification.

This invention relates to meat slicing machines and it has for its object to provide a meat support for the same for the purpose of insuring the proper and efficient cutting of the slices of soft and rolled meats.

Heretofore it has been proposed to provide a meat slicing machine with a meat support which takes the form of an upright bar or a curved plate but such upright bar or plate has been found ineffective for the reason that no means is provided whereby the support can automatically adjust itself to suit any irregularities in the shape or thickness of the roll of bacon or such like.

Under my invention the meat support is provided with a spring or equivalent arrangement so that the meat, which is supported by the holder, is held in position and while being cut is always pressed yieldingly forward against the edge of the knife.

Figure 1:
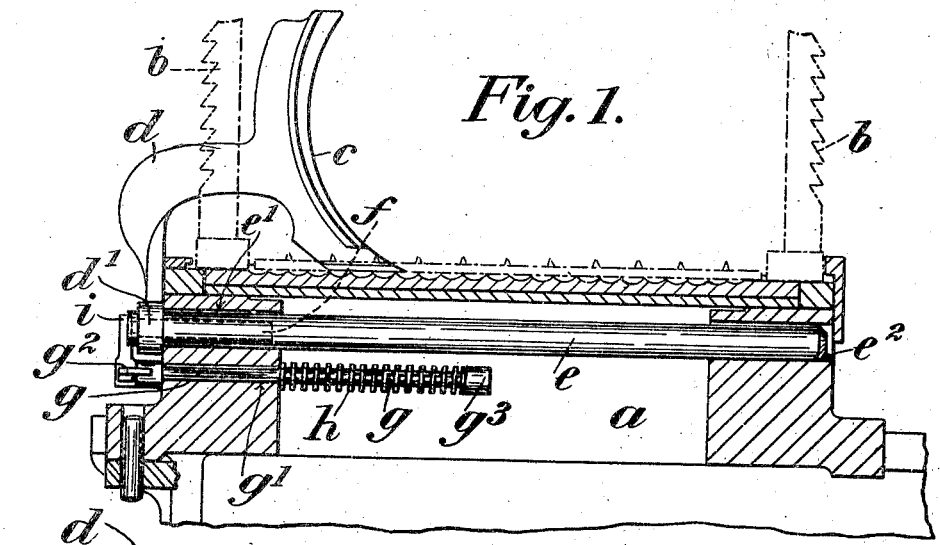
Figure 2:
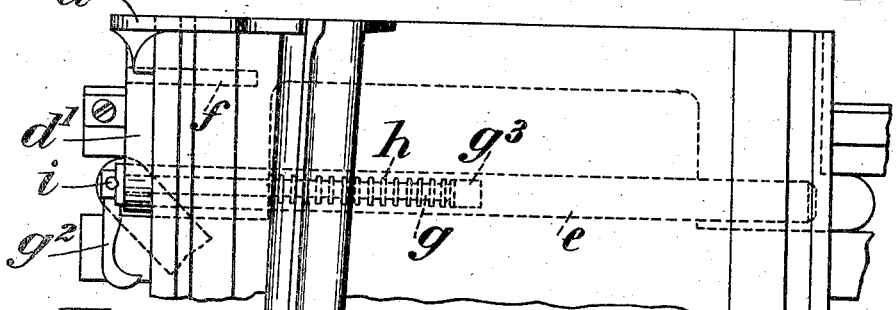
Figure 3:
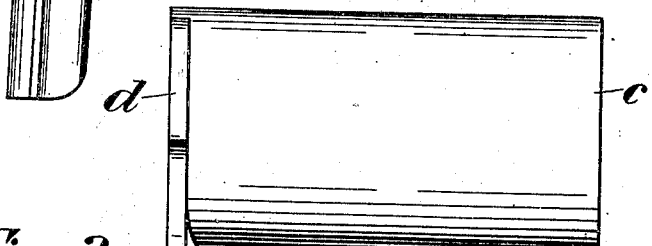

In order that my invention may be clearly understood I have hereunto appended an explanatory sheet of drawings, whereon:

Figure 1 is a section showing part of the traveling table of a meat slicing machine with the improved meat support thereon. Fig. 2 is a plan. Fig. 3 is an end view.

$a$ is the table, $b$ the usual uprights and $c$ the curved meat support.

Under my invention the meat support $c$ is made one with or secured to a bracket $d$ which, at its lower end, has a lateral extension $d^1$ to which a guide rod $e$ is attached this guide rod passing through holes $e^1$, $e^2$, in the frame of the table. The extension $d^1$ is also provided with a short guide pin $f$ indicated in dotted lines. Below the guide rod $e$ is a spindle $g$ passed through a hole $g^1$ in the frame and having, at its one end, a head $g^3$ and, at its other end, a bell crank lever $g^2$.

$h$ is a spiral spring wound around the spindle $g$ and which bears against the head $g^3$ and forces the spindle inward.

The bell crank lever $g^2$ has one of its arms V shaped as shown at $i$, Fig. 2, and the V part is adapted to engage with a V-groove in the end of the guide rod $e$.

When using this device the spring $h$ has to be first put out of disengagement until the piece of bacon or ham or such like has been placed on the table of the machine and properly fastened by the meat clamp, the disengagement of the spring being effected by pulling the bell crank lever $g^2$ slightly so as to disengage the part $i$ from the end of the rod $e$ and then turning the lever through an angle out of the way. When the meat has been properly adjusted and secured the spring is thrown into engagement again by turning the bell crank lever $g^2$ so that its vertical arm engages with the V-groove of the rod $e$ whereupon the apparatus is in condition for work.

When cutting the meat the table moves forward and the knife tends to press the meat downward and backward against the holder or support $c$ which yields to a certain extent the spring $h$ being compressed. The action of the spring keeps the meat constantly pressed against the edge of the knife. As a result it will be seen that any irregularities in the shape of the meat due to the windings of the cord around the same or otherwise will be automatically compensated for by the automatic movement of the meat holder, the meat being always pressed up to its work so that a clean cut is obtained and the skin or side of the meat severed without ragging or tearing.

Having now fully described my invention what I claim and desire to secure by Letters Patent is:—

1. In a meat-slicing machine, a table, a guide-rod slidable in the same, a meat support having a bracket secured to the end of said guide-rod, a spindle slidably fitted in the table, a spring upon said spindle and constructed to retract the same, and a lever upon said spindle and detachably engaging the end of the guide-rod.

2. In a meat-slicing machine, a table, a guide-rod supported to slide in the same and formed with a groove in its end, a curved meat-support having a bracket secured to the end of the guide-rod, a spindle fitted to slide in the table, a spring upon said spindle and connected to retract the same, and a bell-crank lever pivoted on the end of said spindle and having one arm engaging the groove in the end of the guide-rod.

3. In a meat slicing machine, the combination with the table thereof, of guides fitted slidably in the table, a meat support connected with said guides, a spindle fitted slidably in the table, a spring acting on said spindle and means for connecting the spindle to and dis-connecting it from one of the guides.

4. In a meat slicing machine, the combination with the table thereof, of a curved meat support, a bracket for holding the same, guides connected with the bracket and fitted slidably in the table, a spindle fitted in the table and having a head thereon, a spring arranged to bear against said head and against the table and a bell crank lever for engaging the spindle with and dis-engaging it from one of the guides.

5. In a meat slicing machine, the combination with the table thereof, of a frame carrying the table, a meat support of curved shape, a bracket for carrying the meat support, guides in the frame, a spindle having a head at one end thereof and a bell crank lever at the other end thereof said bell crank lever being adapted to engage a groove at the end of the guide.

In testimony whereof I affix my signature in presence of two witnesses.

WILHELMUS ADRIANUS van BERKEL.

Witnesses:
 JEAN HENRI CHARLES HUBERT RASSAERTS,
 L. VELTMEIJER.